US012787988B2

(12) United States Patent
Wong

(10) Patent No.: US 12,787,988 B2
(45) Date of Patent: Nov. 10, 2026

(54) HIGHLY PRODUCTIVE ECO-FRIENDLY QUANTITATIVE FEEDING DEVICE

(71) Applicants: KYORIN INDUSTRY (SHENZHEN) CO., LTD., Shenzhen (CN); SOLIS HIGH-TECH IND.(SHENZHEN)LTD, Shenzhen (CN); Tommy Chi-Kin Wong, Shenzhen (CN)

(72) Inventor: Tommy Chi-Kin Wong, Shenzhen (CN)

(73) Assignees: KYORIN INDUSTRY (SHENZHEN) CO., LTD., Shenzhen (CN); SOLIS HIGH-TECH IND.(SHENZHEN)LTD, Shenzhen (CN); Tommy Chi-Kin Wong, Shenzhen (CN)

( * ) Notice: Subject to any disclaimer, the term of this patent is extended or adjusted under 35 U.S.C. 154(b) by 266 days.

(21) Appl. No.: 18/518,475

(22) Filed: Nov. 23, 2023

(65) Prior Publication Data

US 2025/0169477 A1 May 29, 2025

(51) Int. Cl.
*A01K 61/85* (2017.01)

(52) U.S. Cl.
CPC .................................... *A01K 61/85* (2017.01)

(58) Field of Classification Search
USPC ........... 119/51.04, 51.01, 905; 222/449, 336, 222/361
See application file for complete search history.

(56) References Cited

U.S. PATENT DOCUMENTS 1,904,756 A * 4/1933 Wooster .................. A47K 5/10 222/336
3,181,738 A * 5/1965 Hartvig-Johansen ........................ B65D 5/722 222/336
4,109,835 A * 8/1978 Castro ..................... G01F 11/40 222/449
4,408,703 A * 10/1983 Libit ....................... G01F 11/18 222/336
4,562,941 A * 1/1986 Sanfilippo ................. A47F 1/03 222/361

(Continued)

FOREIGN PATENT DOCUMENTS

CN 201467817 * 5/2010 ............ Y02A 40/81
CN 102217568 10/2011

(Continued)

*Primary Examiner* — Andrea M Valenti

(57) ABSTRACT

A highly productive eco-friendly quantitative feeding device includes a containing can, a feeder, and a snap switch. The feeder includes a can cover and an assembly frame part, the assembly frame part has a feed outlet for installing the snap switch, the can cover has a feed inlet for connecting to the month of the containing can. The snap switch includes a switch frame, a pressing part, a measuring hopper, a sealing boss and an elastic fastening structure, the switch frame has a side connected to the pressing part and an opposite side connected to the measuring hopper, the sealing boss and the elastic fastening structure. When the snap switch is assembled into the feeder, a hopper mouth on a side of the measuring hopper is connected to the feed inlet for receiving a fixed amount of the feed, and the sealing boss seals the feed outlet.

8 Claims, 11 Drawing Sheets

(56) References Cited

U.S. PATENT DOCUMENTS

| | | | | | |
|---|---|---|---|---|---|
| 5,421,191 | A * | 6/1995 | Pyko | G01L 23/225 73/1.82 |
| 5,685,461 | A * | 11/1997 | Mitchell | A47G 19/34 222/336 |
| 6,315,170 | B1 * | 11/2001 | Thomson | G01F 11/40 222/359 |
| 6,450,371 | B1 * | 9/2002 | Sherman | G01F 11/18 222/336 |
| 6,811,061 | B2 * | 11/2004 | Tuvim | G01F 11/18 222/336 |
| 6,962,274 | B1 * | 11/2005 | Sherman | G01F 11/18 222/361 |
| 9,481,491 | B1 * | 11/2016 | Tu | B65D 25/20 |
| 2010/0012683 | A1 * | 1/2010 | Flores | G01F 11/18 222/1 |

FOREIGN PATENT DOCUMENTS

| | | | | |
|---|---|---|---|---|
| CN | 106864979 | * | 6/2017 | |
| CN | 109625637 | * | 4/2019 | B65D 83/06 |
| CN | 112777149 | * | 5/2021 | B65D 83/06 |
| CN | 117461591 | * | 1/2024 | A01K 61/85 |
| DE | 10023971 A1 | * | 7/2001 | A47G 19/34 |
| DE | 20208900 | * | 8/2002 | G01F 11/18 |
| DE | 102017008192 | * | 2/2019 | G01F 11/18 |
| EP | 1482283 | * | 12/2004 | G01F 11/18 |
| EP | 1544584 | * | 6/2005 | G01F 11/40 |
| KR | 200337867 | * | 1/2004 | B65D 83/06 |

* cited by examiner

HIGHLY PRODUCTIVE ECO-FRIENDLY QUANTITATIVE FEEDING DEVICE

BACKGROUND OF THE DISCLOSURE

Technical Field

The present disclosure relates to a feeding device, more particularly relates to a highly productive eco-friendly quantitative feeding device.

Description of the Related Art

With the economic development of the society, people have a significant leap in the materials and culture, and raising ornamental fish has been merged with people's life, and domestic culture of ornamental fish is popular. Fishkeeping has become a leisure-time activity, in which we can enjoy the beauty of the relationship between vitality and peace by watching the fish swim and feel the liveness while cultivating our body, mind, and spirit. In order to help fish lovers feed their fish, there is a canned fish feeder in the form of a round or rectangular can with a feed outlet formed at the top to facilitate accessing the feed in order to feed the fish, and the amount of the feed discharged by the feeders of this type is totally determined by the user's perception. However, most ornamental fishes need to be fed regularly! Overfeeding not only leads to an unhealthy growth of the fish, but also shortens the life span of the fish significantly. Therefore, the feeding of ornamental fish has become a big problem for fish lovers. Furthermore, most canned fish feeders are not sufficiently sealed due to their simple structure, causing problems such as the feed stored in the fish feeders being easily fermented and deteriorated and unable to be preserved for a long time, all of which have again and again greatly dampened the interest of fishkeeping.

Therefore, related-art fish feeders such as those disclosed in P.R.C. Patent No. 102217568A capable of storing fish feed and feeding fish with a fixed amount were proposed to assist fishkeepers in quantitative fish feeding. However, the structure of these related-art fish feeders needs to an overall design of components, making the product and molding structures relatively complex, requiring manual installation and production, and resulting in extremely low production capacity, which are not in line with the economic benefits. Meanwhile, due to the complexity of the structure and the quantity of components, it requires massive labor and material resources to assemble and produce the product, which in turn makes the product expensive and unacceptable by fishkeepers. After all, for many fish lovers, fishkeeping is just a hobby for fun, and there is no need to spend too much money on peripheral equipment. Moreover, the feed outlet in the foregoing patented fish feeder is always open and it is difficult to prevent moisture from entering into the fish feeder, resulting in the stored feed being susceptible to mold and deterioration and unable to be stored for a long time, which is also a practical issue.

In view of these issues, it is a main subject of this disclosure to find out how to provide a low-cost and highly practical quantitative feeding tool to help fishkeepers accurately carry out daily quantitative feeding, in order to enhance the probability of healthy growth of ornamental fish, satisfy the fishkeepers' interest, improve the lack of the foregoing related art, and ensure that the feed stored in the fish feeder can be preserved for a long time, while simplifying the process of production of the canned fish feeder for the large-scale fully-automated production process.

SUMMARY OF THE DISCLOSURE

It is a primary objective of the present disclosure to provide a quantitative feeding device with an ingeniously designed cover structure that provides a full sealing effect of the feeding device and a variable quantitative discharge of the feed, so as to ensure a perfect sealing of the feeding device before and after use and a fixed amount of feed discharged from the feeding device each time.

To achieve the aforementioned objective, the present disclosure discloses a highly productive eco-friendly quantitative feeding device for quantitatively accessing a feed, and the device includes: a containing can for containing the feed; a feeder assembled at a can mouth of the containing can and having a can cover and an assembly frame part, the assembly frame part being connected and mounted onto the can cover and having a top area smaller than the top area of the can cover; the can cover having a feed inlet, a side of the assembly frame part being provided with an assembly opening, a top surface of the assembly frame part being provided with a feed outlet, and a displacement existing between the center point of the feed inlet and the center point of the feed outlet; and a snap switch including a switch frame, a pressing part, a measuring hopper, a sealing boss and an elastic fastening structure, a side of the switch frame being connected to the pressing part and an opposite side of the switch frame being connected to the measuring hopper, the sealing boss and the elastic fastening structure, and the displacement existing between the center point of the measuring hopper and the center point of the sealing boss, wherein when the snap switch is embedded into the assembly opening and movably assembled into the feeder, the hopper mouth of the measuring hopper is connected to the feed inlet to receive and accommodate a fixed amount of the feed, and the sealing boss is sealed with the feed outlet; when a pressing force is exerted along a direction on the pressing part, the elastic fastening structure is compressed towards an opposite direction, such that the snap switch is moved along such direction for the displacement, and the sealing boss moves the feed outlet away, while the measuring hopper is moved to the feed outlet to unload and discharge a fixed amount of the feed; when the pressing force is released, the snap switch restores the pressing part, the measuring hopper and the sealing boss to move towards the opposite direction for the displacement by the resilience of the elastic fastening structure.

Wherein, the elastic fastening structure includes an elastic fastener and a rebound part, the elastic fastener is a substantially curved rib, the rebound part is also a substantially curved rib, and the elastic fastener and the rebound part are disposed opposite to each other, such that the front end of the elastic fastener and the front end of the rebound part are opposite to each other, and when the pressing force is exerted on the pressing part, the elastic fastener and the rebound part are contracted in the direction towards the center of the snap switch. The front end of the elastic fastener is provided with a snap bead, the inner surface on another side of the assembly frame part (which is a side opposite to the side with the assembly opening) is provided with a plurality of acoustic positioning ribs, the acoustic positioning ribs are arranged with a gap from one another; when the snap switch is assembled to the feeder, the snap bead is adjacent to one of the acoustic positioning ribs, and when the pressing force is exerted on the pressing part to compress the elastic fastener, the snap bead successively slides through each acoustic positioning rib and makes a sound to achieve an effect of feeding back the pushing progress by the sound; while the snap bead successively snaps on a side of each acoustic positioning rib to achieve an anti-slip effect, so as to reduce the requirement of continuously outputting the pressing force and facilitating the ease of use.

The sealing boss includes a tilting table top; the sealing boss has a bump edge length at least greater than the opening side length of the feed outlet by 1 mm, the sealing boss is made of a highly elastic plastic and provided for elastically abutting against the feed outlet, in order to avoid air leakage and achieve the effect of slowing down the fermentation and deterioration of the feed. The inner side of the top surface of the can cover is formed with a plurality of tilted covers, each extending outward from the center of the feed inlet, the tilted covers are provided for enhancing the effect concentrating and sliding the feed towards the feed inlet by the tilt angle of the tilted covers, and the surface periphery of the top surface of the assembly frame part is formed with a protruding fence for surrounding the feed outlet to prevent the feed from overflowing and wasting. At least one of the tilted covers is configured with a different exposed area and a different tilt angle.

In addition, the highly productive eco-friendly quantitative feeding device further includes a moisture-resisting film covered onto the can mouth of the containing can for preventing moisture from penetrating, so as to extend the expiration date of the feed before it is unopened for use. the containing can is a substantially round can having an outer thread form on the outer side of the can mouth, an inner thread formed on the inner side of the opening of the can cover and configured to be corresponsive to the round cover, and the feeder is coupled to the containing can through the outer thread and the inner thread; the assembly frame part is configured to be corresponsive to the can cover and is a substantially semicircular frame with a top area smaller than the top area of the can cover, and the pressing part is substantially fan-shaped, such that when the snap switch is installed into the assembly frame part, the pressing part is partially or wholly exposed from the top area of the assembly frame part, and the top area of the assembly frame part coupled to the exposed area of the pressing part is smaller than or equal to the exposed area of the round can mouth of the containing can. when the containing can is formed by a plastic molding machine or a blow molding machine, the snap switch is installed into the feeder, and after a moisture-resisting film is installed to the can cover of the feeder, the containing can with the can mouth opening facing upward is placed on a production line for automatic weighing and filling of the feed, and a capping machine is used to screw the feeder installed with the moisture-resisting film to the can mouth of the containing can, and send the feeder to an automatic electromagnetic induction sealing machine to seal the moisture-resisting film onto the can mouth of the round containing can, so as to achieve a highly efficient automatic filling process.

In addition, the containing can is a substantially rectangular can with a hook structure disposed on the outer side of the can mouth, the can cover is a substantially rectangular cover with a hook slot structure disposed on the inner side of an opening of the can cover and configured to be corresponsive to the hook structure, and the feeder is coupled to the containing can through the hook slot structure and the hook structure; the assembly frame part is a rectangular frame configured to be corresponsive to the can cover and having an area smaller than the can cover, the pressing part is substantially rectangular, and when the assembly frame part is assembled to the snap switch, the pressing part is partially or wholly exposed from the top area of the assembly frame part, and the top area of the assembly frame part coupled to the exposed area of the pressing part is smaller than or equal to the exposed area of the rectangular can mouth of the containing can.

In summation of the description above, the present disclosure overcomes the drawbacks of the related-art compact, lightweight and portable feeding bottle which is unable to feed with a fixed amount of the feed, seal the feed before or after use, and the present disclosure has the following advantages:

The setup of the measuring hopper installed in the snap switch achieves the function of pouring out a fixed amount of the feed when pressing the switch each time and assists users to make the feeding precisely and easily. With the elastic fastening structure, the snap switch can automatically spring back to seal the highly productive eco-friendly quantitative feeding device after the users release their hand.

The setup of the outer thread of the containing can or the inner thread of the hook structure and the can cover or the hook slot structure allows users to assemble/disassemble the highly productive eco-friendly quantitative feeding device, and facilitates the opening the feeding device and refilling the feed for repeated use, thus achieving the effects of energy saving, carbon reduction, environmental protection, and conservation of earth's resources.

The setup of the moisture-resisting film sealed onto the can mouth of the containing can prevents the feed from being fermented or deteriorated due to the penetration of moisture before opening and use to increase the shelf life at least three times while reducing loss and waste. In addition, the material and structural design of the sealing boss effectively seal the feed inlet and the feed outlet to achieve a secondary sealing effect, so as to further prevent air leakage and avoid the problem of odor spreading or attracting pests.

The setup of the snap bead at the front end of the rib-shaped elastic fastener provides an anti-slip function to reduce the amount of force and the continuous demand for force when the users press the snap switch, and realize the feature of easy use for all age groups. In addition, the setup of each acoustic positioning rib provides the function of reporting the opening/closing progress of the feed outlet through the feedback of the sound to facilitate users to confirm the open status of the feed outlet and ensure that the feed is completely poured out, thus achieving a precise quantitative feeding effect.

The configuration of the switch frame with a side connected to the pressing part and an opposite side connected to the measuring hopper reserves a space between the measuring hopper and the pressing part to facilitate modifying the mold and adjust the volume of the measuring hopper according to the quantitative feeding requirements of customers or the market, so as to realize the variable quantitative feeding feature.

Compared with the existing feeding bottles on the market, the present disclosure involves fewer structural parts and the feeder of the present disclosure is made of environmentally friendly and lightweight materials, which not only reduces production costs, but also simplifies the production process and realizes the fully automated production lines, so as to achieve high production efficiency and benefit the economic development of the industry.

DESCRIPTION OF THE PREFERRED EMBODIMENTS

Figure 1:
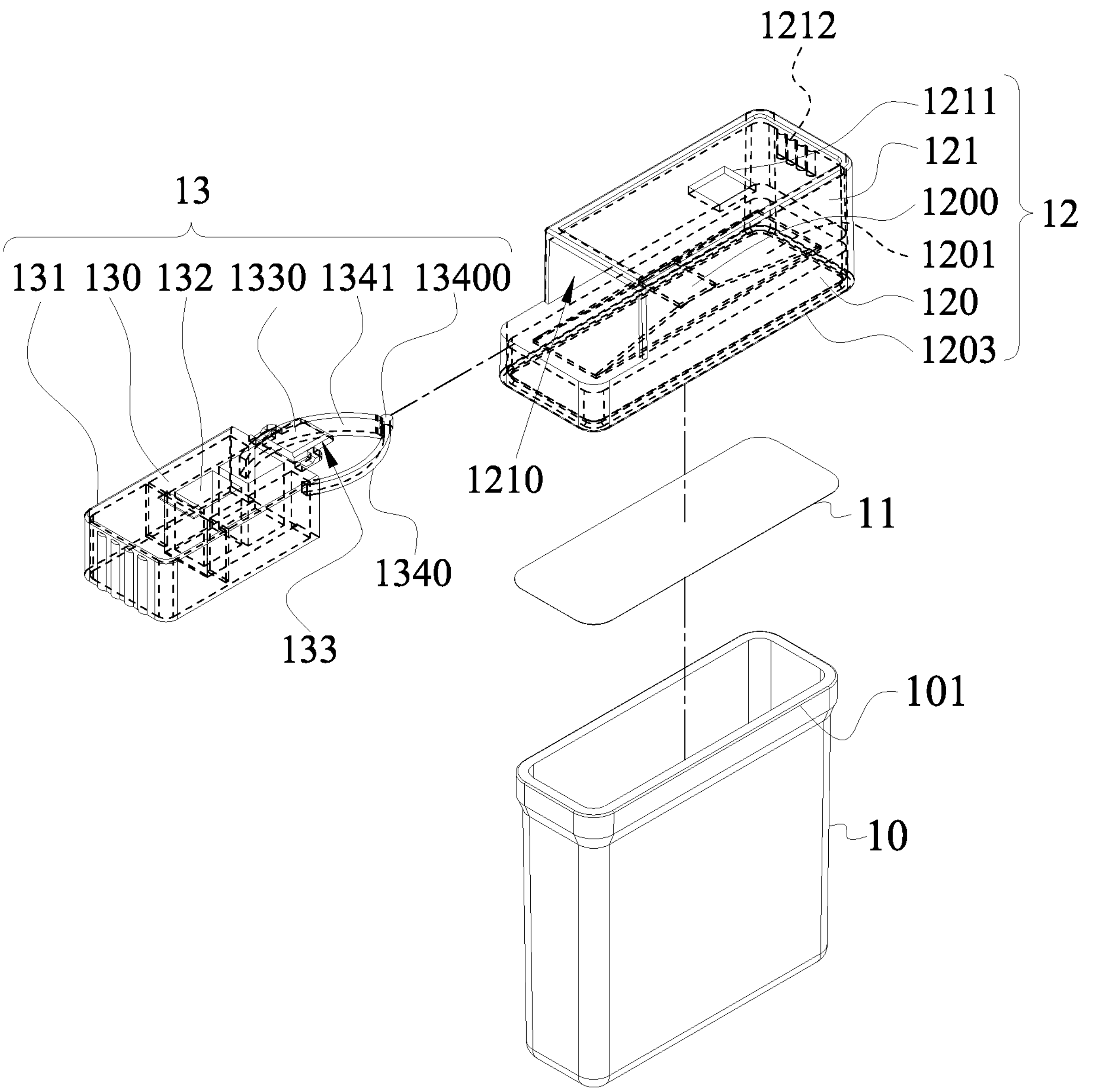
FIG. 1 is a semi-perspective exploded view of a first preferred embodiment of this disclosure.
Figure 2:
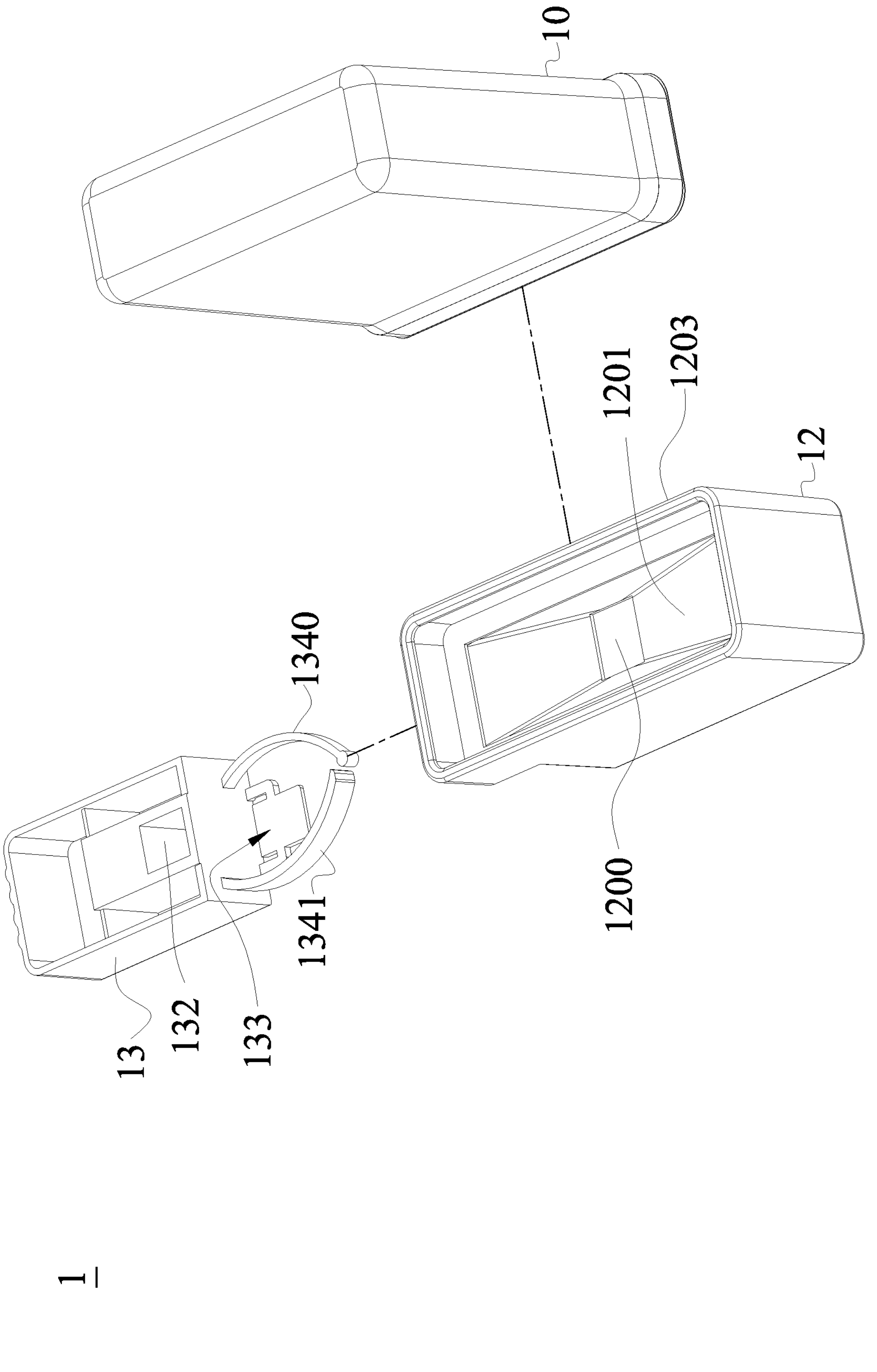
FIG. 2 is another semi-perspective exploded view of the first preferred embodiment of this disclosure.
Figure 3:
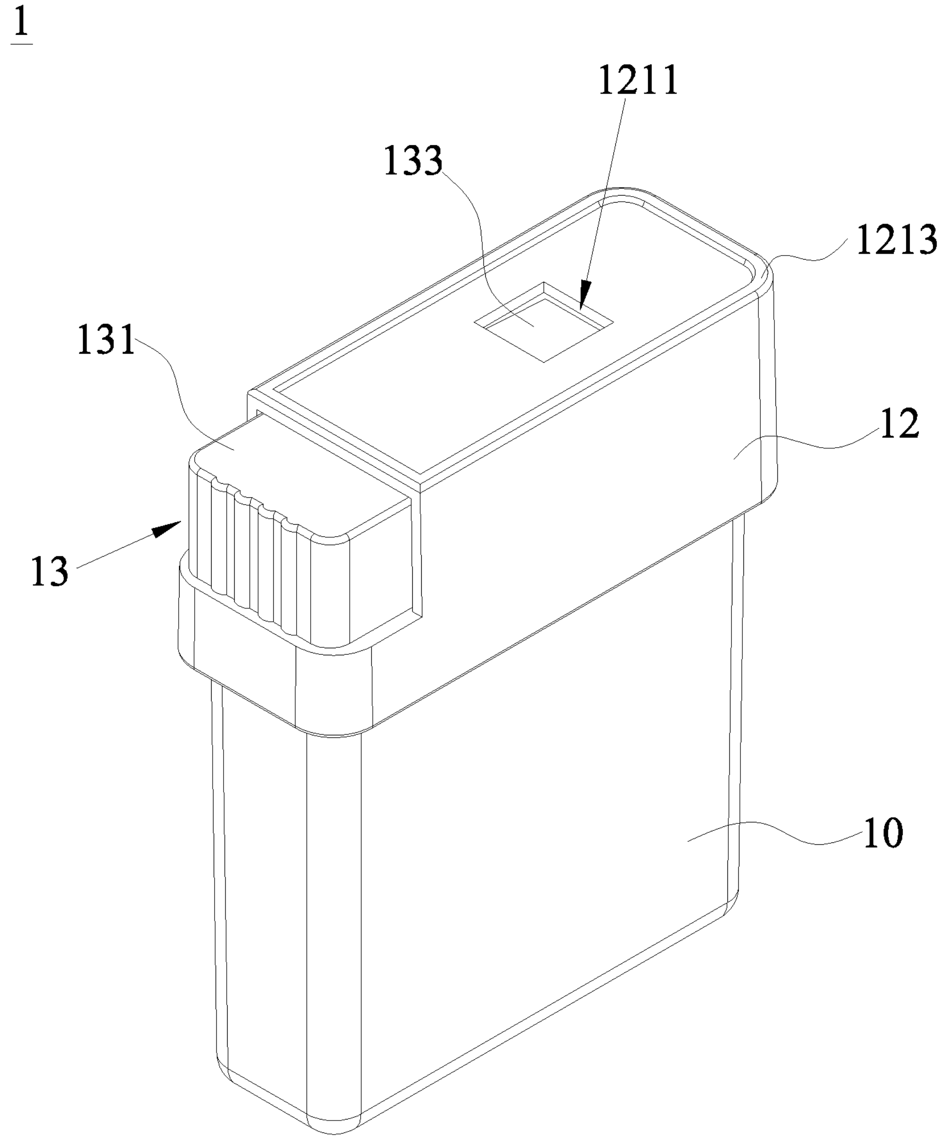
FIG. 3 is a perspective view of the first preferred embodiment of the present disclosure.
Figure 4:
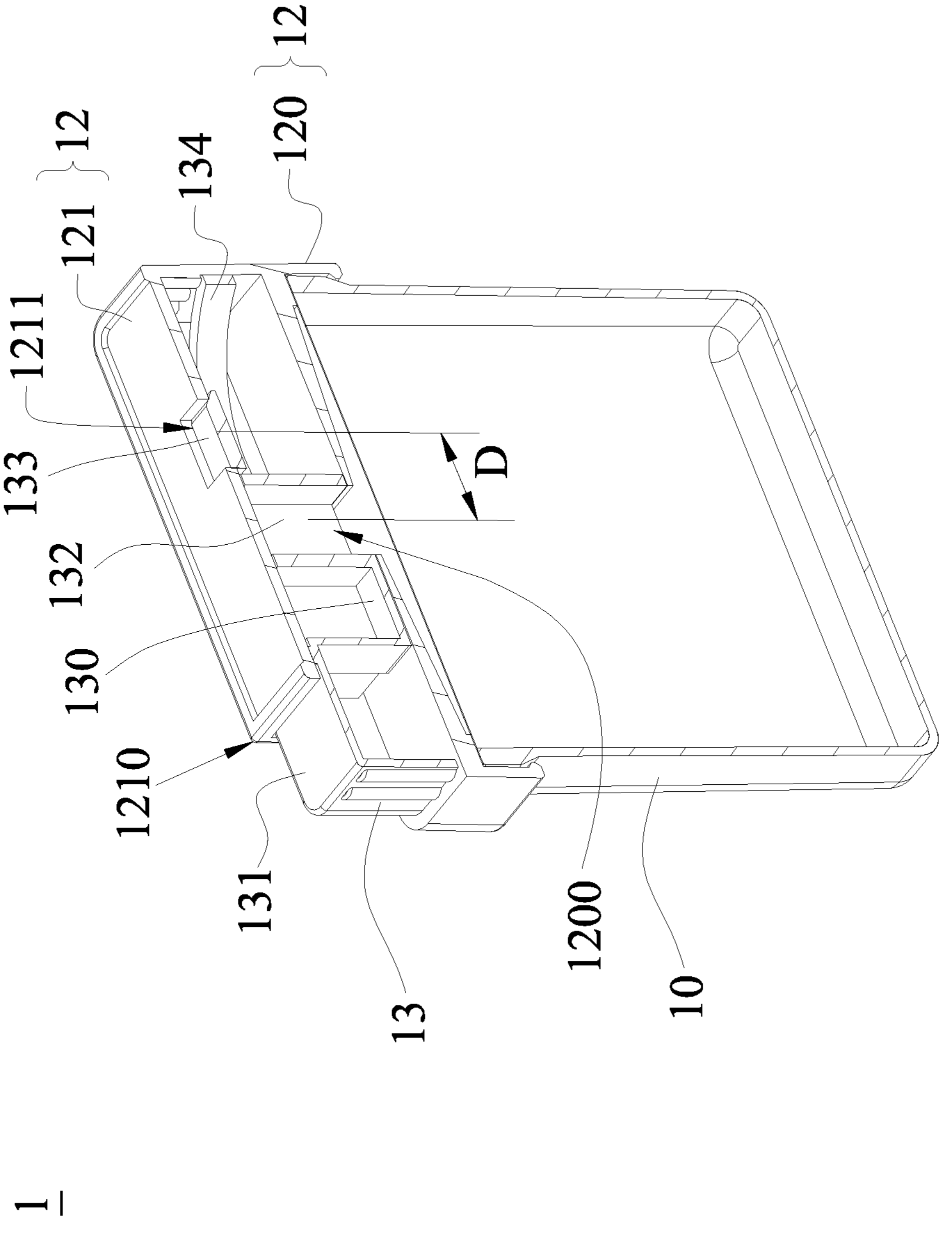
FIG. 4 is a cross-sectional view of the first preferred embodiment of the present disclosure.
Figure 5:
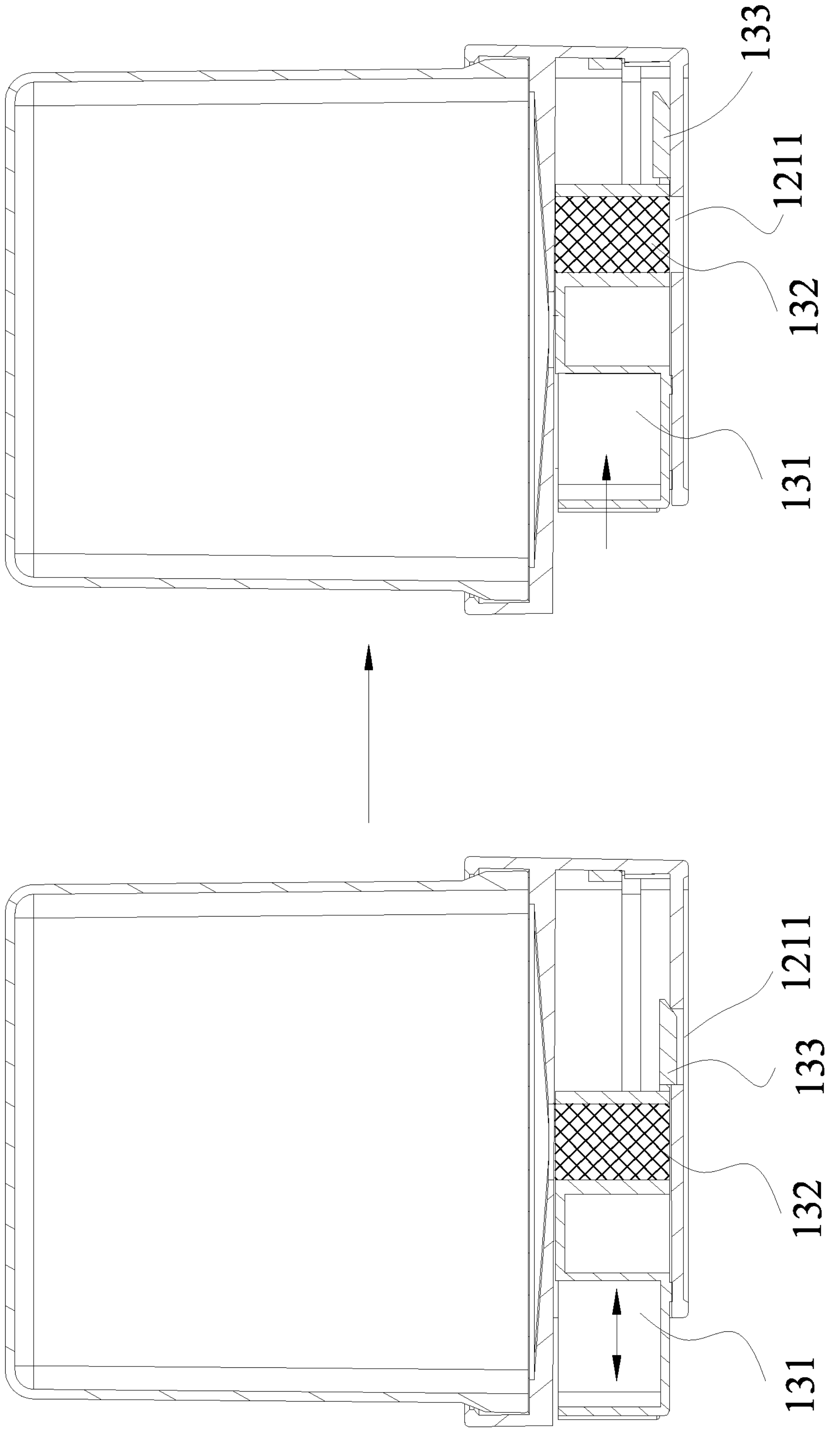
FIG. 5 is a cross-sectional view showing the operation of the first preferred embodiment of the present disclosure.

The objectives, technical contents and features of this disclosure will become apparent in the following detailed description of the preferred embodiments with reference to the accompanying drawings. It is noteworthy that the drawings used in the specification and subject matters of this disclosure are intended for illustrating the technical characteristics of this disclosure, but not necessarily to be drawn according to actual proportion and precise configuration. Therefore, the scope of this disclosure should not be limited to the proportion and configuration of the drawings.

In the description of the following embodiments, the terms such as "Upper", "Inside", "Top", "Side", etc. indicating orientation or positional relationship are descriptive terms based on the orientation or positional relationship shown in the accompanying drawings or the orientation or positional relationship where the product of the present disclosure is customarily placed. These terms are used solely for the purpose of clearly describing the technical characteristics of the product of the present disclosure, but not intended to expressly or impliedly specify that the components, apparatuses, modules, or devices must be configured, oriented, constructed or operated in a particular manner, and therefore these terms should not be construed as a limitation of this disclosure. In addition, the terms "dispose" and "couple" are to be understood in a broad sense, e.g., "Couple" may refer to a fixed connection, a detachable connection, or a physical connection, or refers to a direct connection, an indirect connection through an intermediate medium or a connection within two components, unless otherwise expressly specified and limited. A person having ordinary skill in the art may interpret the above terms in this disclosure based on specific situations.

With reference to FIGS. 1 to 5 for the exploded views, perspective view and cross-sectional view of a highly productive eco-friendly quantitative feeding device of a preferred embodiment of the present disclosure and the cross-sectional view showing the operation the highly productive eco-friendly quantitative feeding device of the present disclosure respectively, the highly productive eco-friendly quantitative feeding device 1 includes a containing can 10, a moisture-resisting film 11, a feeder 12 and a snap switch 13. The containing can 10 is a substantially rectangular can for containing a feed, and the outer side of the can mouth of the containing can 10 is provided with a hook structure 101. The moisture-resisting film 11, such as an aluminum film, is provided for covering and sealing the can mouth of the containing can 10 to prevent air leakage and prevent the feed from being moistened or deteriorated. The feeder 12 is assembled at the can mouth of the containing can 10, and the snap switch 13 is movably assembled into the feeder 12.

The feeder 12 includes a can cover 120 and an assembly frame part 121 and the feeder 12 is configured to be corresponsive to the containing can 10, and the can cover 120 is a substantially rectangular cover, and the assembly frame part 121 is a rectangular frame with an exposed area smaller than the can cover 120, and the assembly frame part 121 is integrally formed and mounted onto the can cover 120. The inner side of the cover opening of the can cover 120 is provided with a hook slot structure 1203 configured to be corresponsive to the hook structure 101, and the feeder 12 is connected to the containing can 10 through the hook slot structure 1203 and the hook structure 101, and the cover top surface of the can cover 120 is provided with a feed inlet 1200, the inner side of the top surface extends outward from the center of the feed inlet 1200 to form a plurality of tilted covers 1201, at least one of the tilted covers 1201 has a different exposed area and a different tilt angle to enhance the effect of concentrating and sliding the feed towards the feed inlet 1200 through the tilt angle and exposed area of the tilted covers 1201. The assembly frame part 121 has a side provided with an assembly opening 1210 and an inner surface of the opposite side provided with a plurality of acoustic positioning ribs 1212 spaced apart from one another, and the top surface of the assembly frame part 121 is provided with a feed outlet 1211, and a fence 1213 is protruded from the surface periphery of the top surface for surrounding the feed outlet 1211 to prevent the feed from overflowing and falling out in different directions and causing unnecessary waste when the feed is poured out from the feeder. Wherein, there is a displacement D between the center point of the feed inlet 1200 and the center point of the feed outlet 1211.

The snap switch 13 is configured to be corresponsive to the containing can 10 and the feeder 12, and is a substantially rectangular box having a switch frame 130, a pressing part 131, a measuring hopper 132, a sealing boss 133 and an elastic fastening structure 134. The switch frame 130 is in a box-like form and has a side connected to the pressing part 131 and an opposite side connected to the sealing boss 133. The measuring hopper 132 is a substantially hollow rectangular cylinder installed in the switch frame 130, and has a side coupled to the sealing boss 133, and there is a displacement D between the center point of the measuring hopper 132 and the center point of the sealing boss 133, and the switch frame 130 includes the elastic fastening structure 134 disposed on the outer side surface of the sealing boss 133. In this way, there is a space between the measuring hopper 132 and the pressing part 131 to facilitate adjusting the size of the measuring hopper 132 and modifying the mold according to the market demand or the feeding level, so as to realize the variable quantitative feeding function and provide high market adaptability. The pressing part 131 is in a substantially rectangular shape and configured to be corresponsive to the feeder 12. When the snap switch 13 is installed into the assembly frame part 121, the pressing part 131 is partially or wholly exposed from the top area of the assembly frame part 121, and the top area of the assembly frame part 121 connected to the exposed area of the pressing part 131 is smaller than or equal to the exposed area of the rectangular can mouth of the containing can 10, so that the highly productive eco-friendly quantitative feeding device 1 has high consistency in overall appearance and enhances its visual aesthetic appearance.

The elastic fastening structure 134 includes an elastic fastener 1340 and a rebound part 1341, the elastic fastener 1340 is a substantially curved rib, the rebound part 1341 is also a substantially curved rib, and the elastic fastener 1340 and the rebound part 1341 are disposed opposite to each other, such that the front end of the elastic fastener 1340 and the front end of the rebound part 1341 are configured to be opposite to each other. Wherein, the elastic fastener 1340 and the rebound part 1341 are configured to have a vertical difference in height relative to each other. In other words, the elastic fastener 1340 and the rebound part 1341 are not disposed on the same horizontal plane, so that when the front end of the elastic fastener 1340 and the front end of the rebound part 1341 are opposite to each other, there will be a horizontal spacing and a vertical spacing between them.

In addition, the front end of the elastic fastener 1340 is provided with a snap bead 13400, and when the snap switch 13 is embedded into the assembly opening 1210 and movably assembled into the feeder 12, a side hopper mouth of the measuring hopper 132 is connected to the feed inlet 1200 to receive and accommodate a fixed amount of the feed, and the sealing boss 133 connects and seals the feed outlet 1211, and the snap bead 13400 is adjacent to one of the acoustic positioning ribs 1212, and the rebound part 1341 is adjacent to the inner wall on a side of the assembly frame part 121. Wherein, the sealing boss 133 is in a substantially rectangular shape and its surface is provided with a tilting table top 1330 which is tilted with an angle. The sealing boss 133 is made of a highly elastic plastic, and its bump edge length is at least greater than the opening side length of the feed outlet 1211 by 1 mm, so as to elastically abut against the feed outlet 1211 to avoid air leakage and achieve the effect of slowing down the fermentation and deterioration of the feed. In this way, the setup of the rectangular sealing boss 133 and the acoustic positioning rib 1212 improving the shifting position configuration of the feed outlet 1211 by controlling the pushing progress of the snap switch 13. For example, in the measuring hopper 132 with a volume of 30 ml, the pushing progress of the snap switch 13 is controlled by the rectangular sealing boss 133 and the acoustic positioning rib 1212 to define three shifting positions in order to adjust the amount of the feed discharged from the feed outlet 1211 at a time to 10 ml, 20 ml or 30 ml, so as to realize the variable quantitative feeding effect.

When the user wants to use the highly productive eco-friendly quantitative feeding device 1 for feeding and applies a pressing force to the pressing part 131 in a direction, the elastic fastening structure 134 is compressed to move towards an opposite direction, so that the rebound part 1341 and the elastic fastener 1340 are contracted in a direction towards the center of the snap switch 13. At this time, the front end of the rebound part 1341 abuts against the inner wall on a side of the assembly frame part 121 and slides and contracts, and the snap bead 13400 successively slides through the acoustic positioning ribs 1212 one by one and emits a sound, so as to achieve the effect of feeding back the pushing progress by the sound. Meanwhile, the snap bead 13400 can be snapped to a side of each acoustic positioning rib 1212 to achieve an anti-slip effect, so as to reduce the continuous output requirement of the pressing force and facilitate an ease of use. In addition, when the user applies the pressing force to move the snap switch 13 in a direction for the displacement D, the sealing boss 133 slides away from the feed outlet 1211 by means of the tilting table top 1330, and at the same time, the measuring hopper 132 is moved to the feed outlet 1211 correspondingly to unload and pour out a fixed amount of the feed. When the user releases the pressing force after use, the snap switch 13 restores its original position by the resilience of the elastic fastening structure 134, such that the pressing part 131, the measuring hopper 132 and the sealing boss 133 are moved in an opposite direction for the displacement D, and then the feed outlet 1211 is sealed by the sealing boss 133 and the hopper mouth of the measuring hopper 132 is connected to the feed inlet 1200 again. Therefore, the present disclosure can use the elastic fastening structure 134 to realize the quantitative feeding effect. When the user presses the pressing part 131 once to discharge a fixed amount of the feed from the measuring hopper 132, the feeding with a precise quantitative feeding effect can be achieved. When the user releases the hand, the elastic fastening structure 134 will automatically spring back, thus realizing the effects of instantaneously sealing and storing the feed, reducing the oxidation time of the feed, and greatly extending the period of use.

Figure 6:
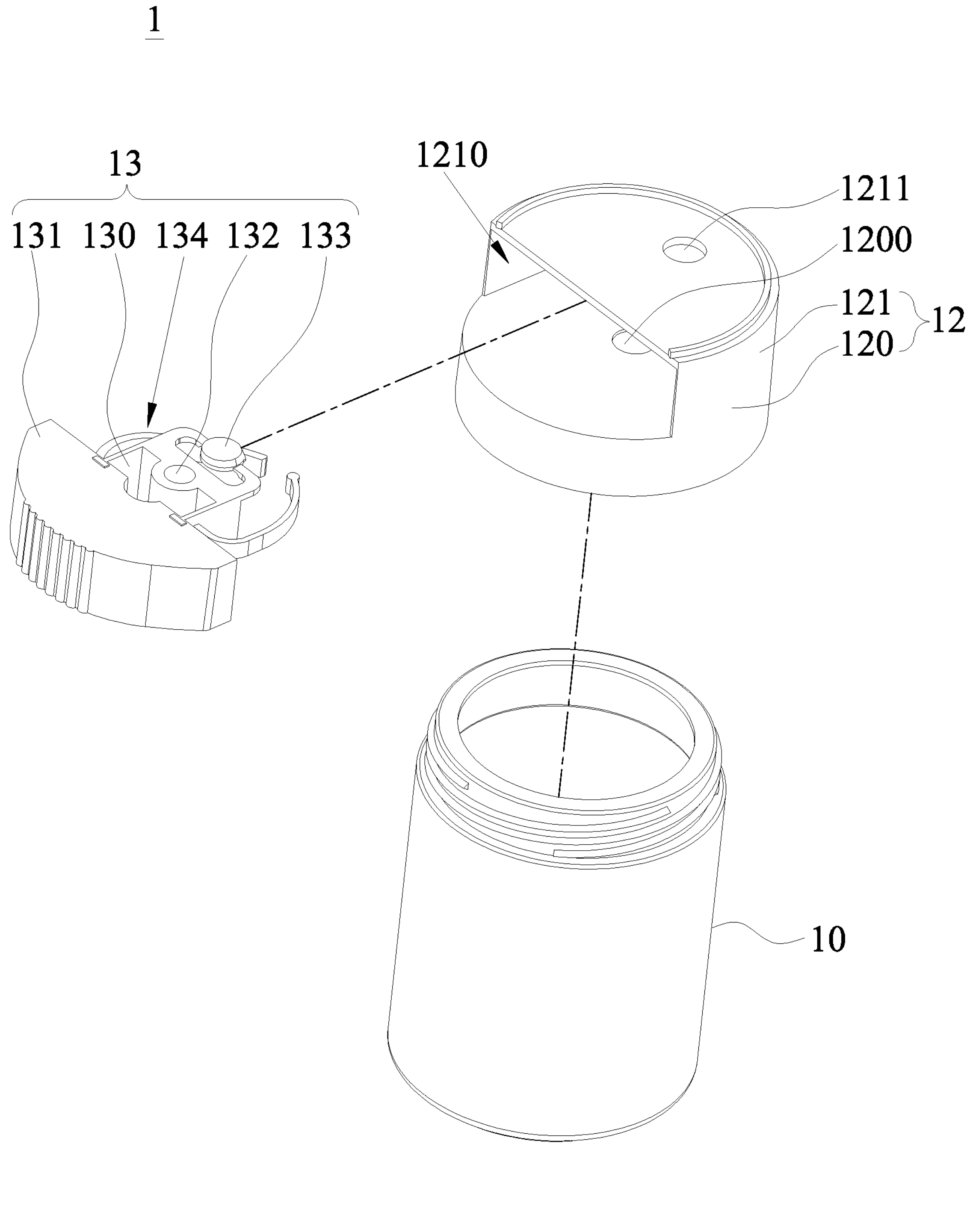
FIG. 6 is an exploded view of a first implementation mode of a second preferred embodiment of the present disclosure.
Figure 7:
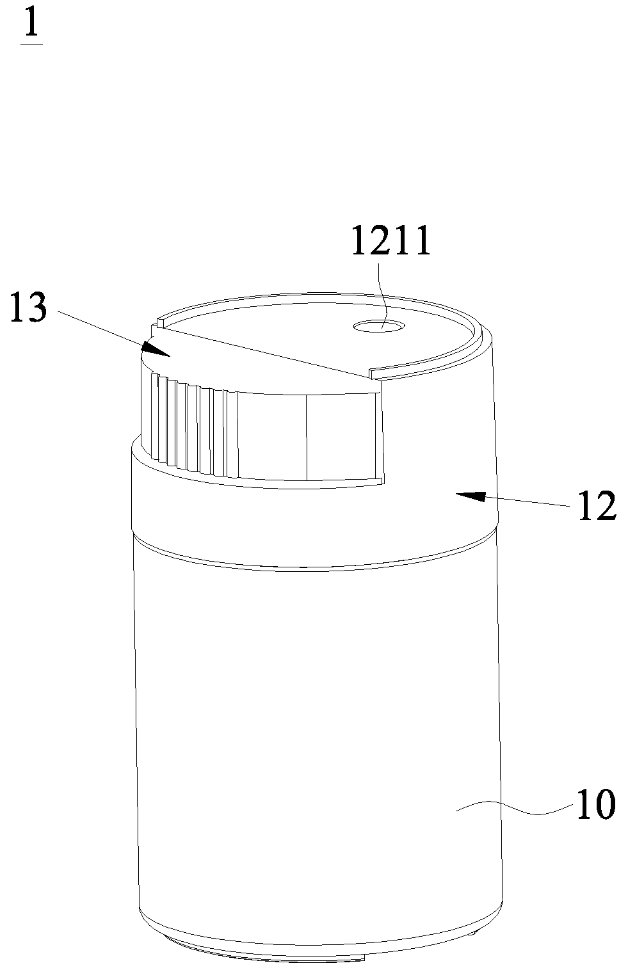
FIG. 7 is a perspective view of the first implementation mode of the second preferred embodiment of the present disclosure.
Figure 8:
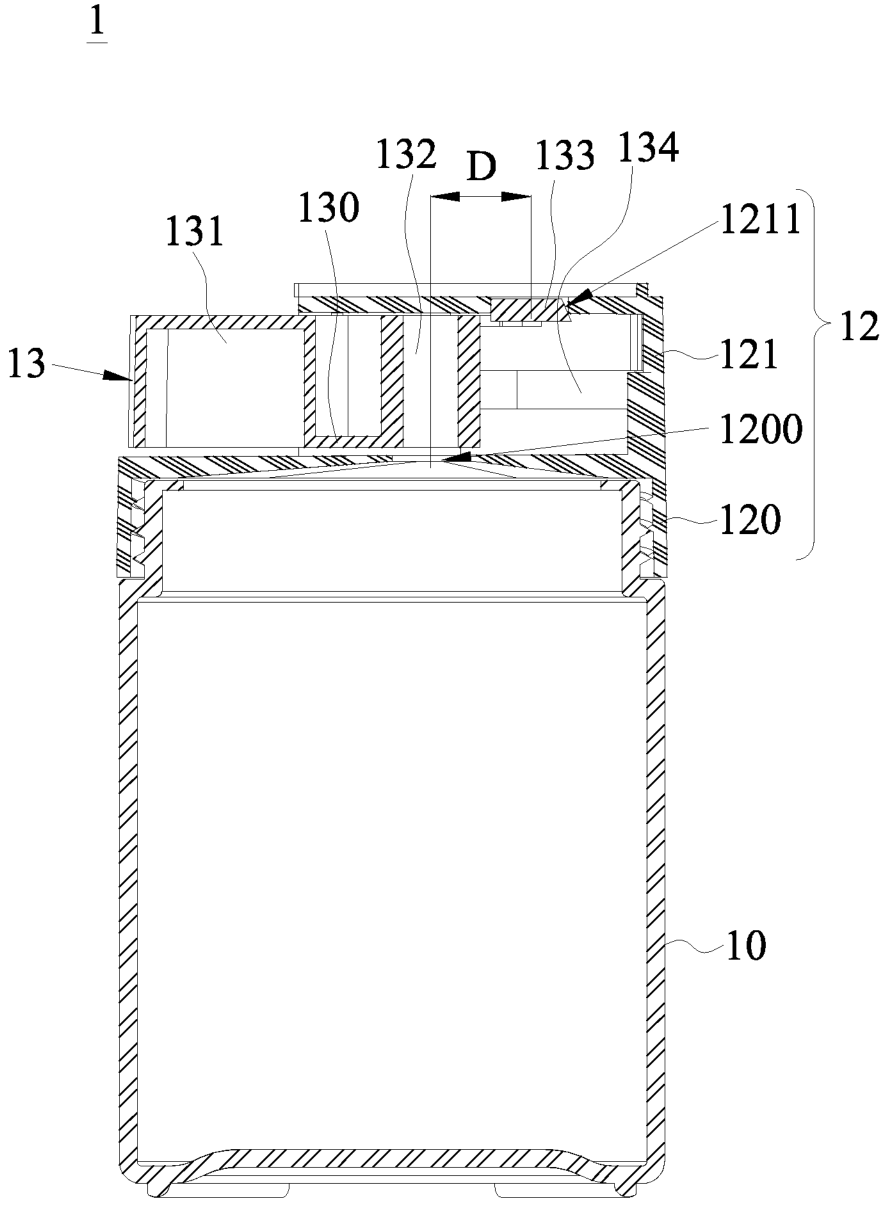
FIG. 8 is a cross-sectional view of the first implementation mode of the second preferred embodiment of the present disclosure.

With reference to FIGS. 6 to 8 for the exploded view, perspective view and cross-sectional view of the first implementation mode of a preferred embodiment of the present disclosure respectively, the highly productive eco-friendly quantitative feeding device 1 for quantitatively accessing a feed includes a containing can 10, a feeder 12 and a snap switch 13, the feeder 12 is assembled into a can mouth of the containing can 10, and the snap switch 13 is movably assembled into the feeder 12. The feeder 12 includes a can cover 120 and an assembly frame part 121, the assembly frame part 121 is connected and mounted onto the can cover 120, and the assembly frame part 121 has a top area smaller than the top area of the can cover 120. The can cover 120 is provided with a feed inlet 1200, the assembly frame part 121 has a side provided with an assembly opening 1210 and a top surface provided with a feed outlet 1211, and there is a displacement D between the center point of the feed inlet 1200 and the center point of the feed outlet 1211. The snap switch 13 includes a switch frame 130, a pressing part 131, a measuring hopper 132, a sealing boss 133 and an elastic fastening structure 134, the switch frame 130 has a side connected to the pressing part 131 and an opposite side connected to the measuring hopper 132, the sealing boss 133 and the elastic fastening structure 134, and the displacement D exists between the center point of the measuring hopper 132 and the center point of the sealing boss 133.

The containing can 10 is provided for containing the feed, and when the snap switch 13 is embedded into the assembly opening 1210 and assembled in the feeder 12, the hopper mouth of the measuring hopper 132 is connected to the feed inlet 1200 to receive and accommodate a fixed amount of the feed, and the sealing boss 133 connects and seals the feed outlet 1211. When a pressing force is exerted in a direction on the pressing part 131, the elastic fastening structure 134 is compressed to move in an opposite direction, so that the snap switch 13 is moved towards the direction for the displacement D, and the sealing boss 133 moves away the feed outlet 1211, while the measuring hopper 132 is moved to the feed outlet 1211 to unload and pour out a fixed amount of the feed. In addition, when the pressing force is released, the snap switch 13 restores its original positon by the resilience of the elastic fastening structure 134, so that the pressing part 131, the measuring hopper 132 and the sealing boss 133 are moved in the opposite direction for the displacement D, and the sealing boss 133 seals the feed outlet 1211, and the hopper mouth of the measuring hopper 132 connects the feed inlet 1200 again.

Figure 9:
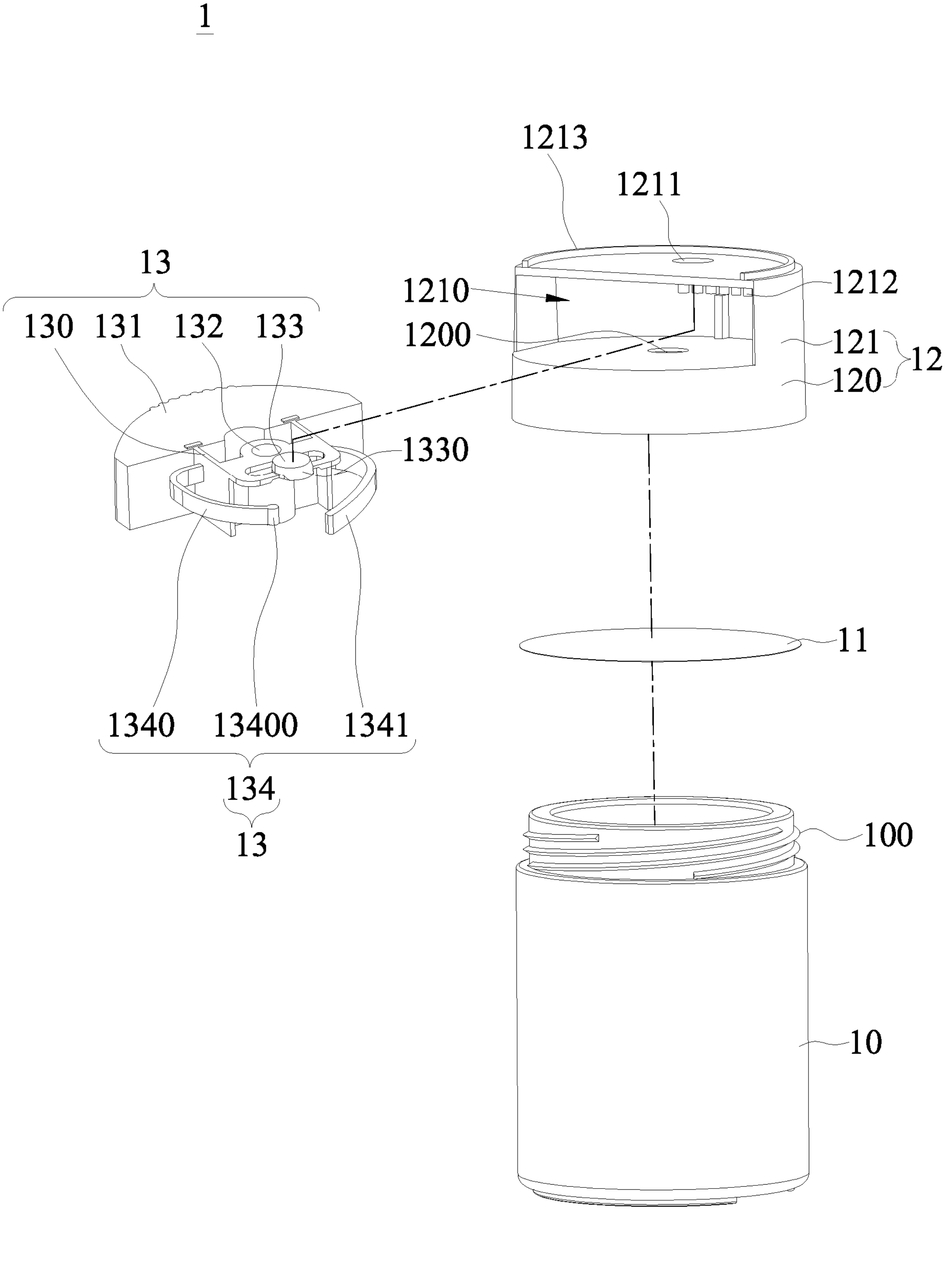
FIG. 9 is an exploded view of a second implementation mode of the second preferred embodiment of the present disclosure.
Figure 10:
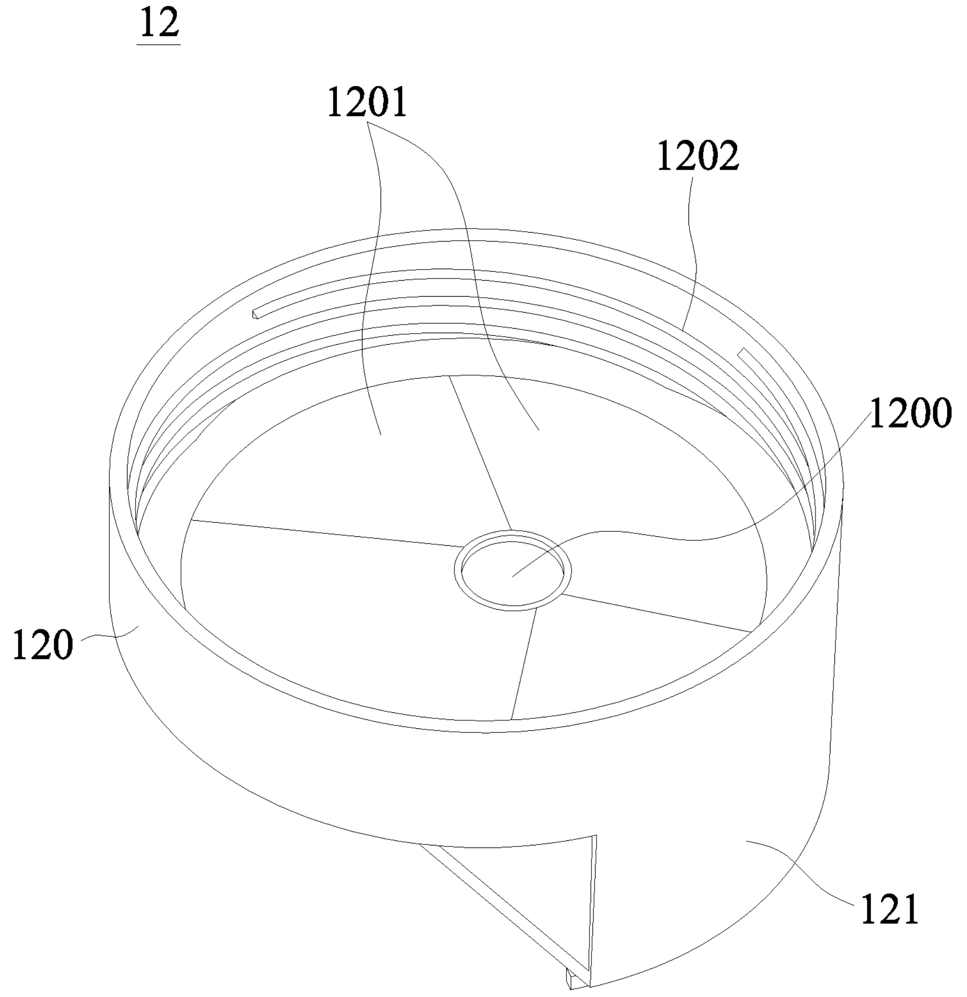
FIG. 10 is a schematic view of a feed discharger of the second implementation mode of the second preferred embodiment of the present disclosure.
Figure 11:
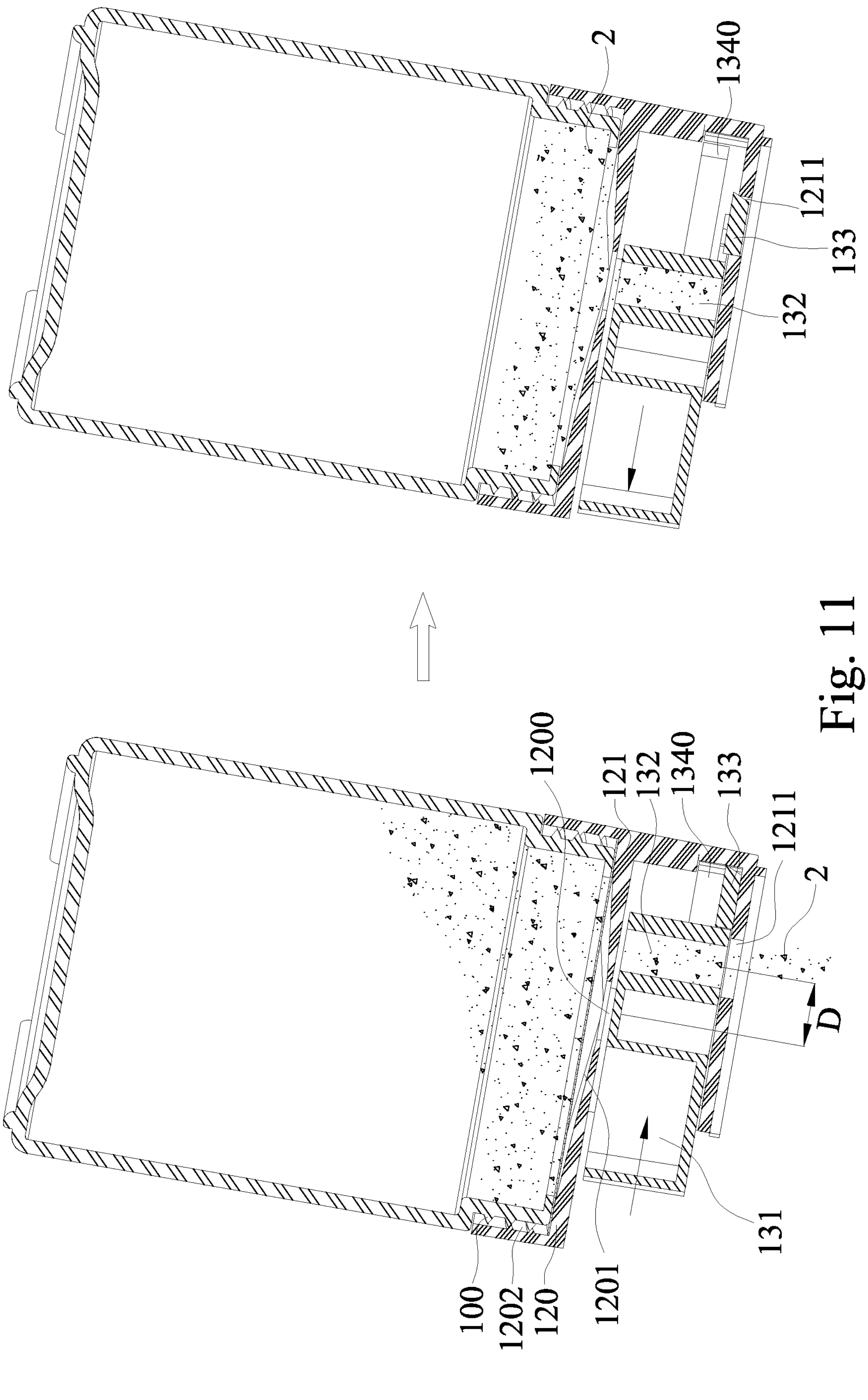
FIG. 11 is a cross-sectional view showing the operation of the second implementation mode of the second preferred embodiment of the present disclosure.

With reference to FIGS. 9 to 11 for the exploded view of a feed discharger, the schematic view and the cross-sectional view showing the second implementation mode of a preferred embodiment of the present disclosure respectively, the highly productive eco-friendly quantitative feeding device 1 for quantitatively accessing a feed 2, and the device includes a containing can 10, a moisture-resisting film 11, a feeder 12 and a snap switch 13, the moisture-resisting film 11 is provided for covering the can mouth of the containing can 10, the feeder 12 is assembled at the can mouth of the containing can 10, and the snap switch 13 is movably assembled into the feeder 12. The containing can 10 is a substantially round can for containing the feed 2, and the outer side of the can mouth of the containing can 10 is provided with an outer thread 100.

The feeder 12 includes a can cover 120 and an assembly frame part 121, the feeder 12 is configured to be corresponsive to the containing can 10, the can cover 120 is a substantially round cover, and the assembly frame part 121 is a substantially semicircular frame. The assembly frame part 121 is integrally formed and mounted onto the can cover 120, and the assembly frame part 121 has a top area smaller than the top area of the can cover 120. The cover top surface of the can cover 120 is provided with a feed inlet 1200, and the inner side of the top surface inner side is provided with a plurality of tilted covers 1201 extending outward from the center of the feed inlet 1200, and at least one of the tilted covers 1201 has a different exposed area and a different tilt angle. With the tilt angle and exposed area of the tilted covers 1201, the effect of concentrating and sliding the feed 2 towards the feed inlet 1200 can be improved. In addition, the inner side of the cover opening of the can cover 120 is provided with an inner thread 1202 which is configured to be corresponsive to the outer thread 100, for connecting the feeder 12 to the containing can 10 through the outer thread 100 and the inner thread 1202. The assembly frame part 121 has a side provided with an assembly opening 1210 and an opposite side with an inner top side provided with a plurality of acoustic positioning ribs 1212 which are arranged with a gap from one another, and the top surface of the assembly frame part 121 is provided with a feed outlet 1211, and the surface periphery of the top surface is provided with a fence 1213 for surrounding the feed outlet 1211 to avoid unnecessary waste when the feed 2 is poured out and overflown or fallen off from different directions. Wherein, there is a displacement D between the center point of the feed inlet 1200 and the center point of the feed outlet 1211.

The snap switch 13 includes a switch frame 130, a pressing part 131, a measuring hopper 132, a sealing boss 133 and an elastic fastening structure 134. The switch frame 130 is in a box-like form with a side connected to the pressing part 131 and an opposite side connected to the measuring hopper 132 (which is in the form of a hollow round tube), the switch frame 130 has a support plate extended from the top of two sides of the measuring hopper 132 to carry and connect the sealing boss 133, and the displacement D exists between the center point of the measuring hopper 132 and the center point of the sealing boss 133, and the two opposite sides of the switch frame 130 are provided with the elastic fastening structure 134. Therefore, there is a space between the measuring hopper 132 and the pressing part 131 to facilitate adjusting the size of the measuring hopper 132 and modifying the mold feeding according to the market demand or the feeding level, so as to realize the variable feeding effect and provide high market adaptability. The pressing part 131 is substantially fan-shaped and configured to be corresponsive to the feeder 12. When the snap switch 13 is installed into the assembly frame part 121, the pressing part 131 is partially or wholly exposed from the top area of the assembly frame part 121, and the top area of the assembly frame part 121 connected to the exposed area of the pressing part 131 is smaller than or equal to the exposed area of the round can mouth of the containing can 10, so that the highly productive eco-friendly quantitative feeding device 1 is consistent in overall appearance to enhance its visual aesthetic appearance.

The elastic fastening structure 134 includes an elastic fastener 1340 and a rebound part 1341, the elastic fastener 1340 is a substantially curved rib, the rebound part 1341 is also a substantially curved rib, and the elastic fastener 1340 and the rebound part 1341 are disposed opposite to each other and connected to two sides of the switch frame 130 respectively, so that the front end of the elastic fastener 1340 and the front end of the rebound part 1341 are configured to be opposite to each other. Wherein, the elastic fastener 1340 and the rebound part 1341 have a vertical height difference and are disposed on two sides of the switch frame 130 respectively. In other words, the elastic fastener 1340 and the rebound part 1341 are not disposed on the same horizontal plane, so that when the front end of the elastic fastener 1340 and the front end of the rebound part 1341 are opposite to each other, the elastic fastener 1340 and the rebound part 1341 have both horizontal and vertical spacing. In addition, the front end of the elastic fastener 1340 is provided with a snap bead 13400. When the snap switch 13 is embedded into the assembly opening 1210 and movably assembled into the feeder 12, a side hopper mouth of the measuring hopper 132 is connected to the feed inlet 1200 to receive and accommodate a fixed amount of the feed 2, the sealing boss 133 connects and seals the feed outlet 1211, the snap bead 13400 is adjacent to one of the acoustic positioning ribs 1212, and the rebound part 1341 is adjacent to a side inner wall of the assembly frame part 121. Wherein, the sealing boss 133 is in a substantially cylindrical shape and its side is provided with a tilting table top 1330 which is tilted to an angle, and the sealing boss 133 is made of a highly elastic plastic and has a bump edge length at least greater than the opening side length of the feed outlet 1211 by 1 mm, thus elastically abutting the feed outlet 1211 to avoid air leakage and achieve the effect of slowing down the fermentation and deterioration of the feed.

When the user wants to use the highly productive eco-friendly quantitative feeding device 1 for feeding and applies a pressing force along a direction to the pressing part 131, the elastic fastening structure 134 is compressed towards an opposite direction to contract the rebound part 1341 and the elastic fastener 1340 to move towards the center of the snap switch 13. At this time, the front end of the rebound part 1341 abuts against the inner side wall of the assembly frame part 121 to slide and contract, and the snap bead 13400 slides through the acoustic positioning ribs 1212 one by one and contracts to produce a sound, and let the user know about the moving distance by feeding back the pushing progress by the sound. The snap bead 13400 can be snapped on a side of each acoustic positioning rib 1212 to achieve an anti-slip effect, so as to reduce the requirement of continuously outputting the pressing force and facilitating the ease of use. In addition, when the user continues to apply the pressing force to move the snap switch 13 in a direction for the displacement D, the sealing boss 133 slides away from the feed outlet 1211 by means of the tilt angle of the tilting table top 1330. At the same time, the measuring hopper 132 is moved to the feed outlet 1211 correspondingly to unload and pour out a fixed amount of the feed 2 through the hopper mouth on the other side. When the user release the pressing force after use, the snap switch 13 restores its original position by the resilience of the elastic fastening structure 134, so that the pressing part 131, the measuring hopper 132 and the sealing boss 133 are moved in the opposite direction for the displacement D, and the sealing boss 133 seals the feed outlet 1211, and the hopper mouth of the measuring hopper 132 is connected to the feed inlet 1200 again.

It is noteworthy that the whole snap switch 13 is made of a highly elastic plastic and its periphery is coated with a highly elastic plastic film, such that when the snap switch 13 is pushed or restored by the pressing force, the elastic materials of the switch frame 130 and the sealing boss 133 abut the feed inlet 1200 and the feed outlet 1211 to avoid unnecessary waste caused by the leakage at the feed inlet 1200 during the operation of the feeder 12 and ensure the tightness between the measuring hopper 132 and the feed inlet 1200 before use as well as the tightness between the sealing boss 133 and the feed outlet 1211 to achieve the secondary sealing effect, effectively prevent air leakage and the fermentation or deterioration of the feed 2 due to the air leakage, and avoid the problem of odor spreading or attracting pests. The present disclosure involves a simple structure and very little components, thus simplifying the production process. In the production process, after the containing can 10 is formed by a plastic molding machine or a blow molding machine, the snap switch 13 is installed in the feeder 12 and the can cover 120 of the feeder 12 is installed with the moisture-resisting film 11 such as aluminum foil or aluminum film, the containing can 10 with its can mouth facing upward is placed on a production line for automatic weighing and filling of the feed, and a capping machine is used to screw the feeder 12 with the moisture-resisting film 11 to the can mouth of the containing can 10, and send the feeder 12 to an automatic electromagnetic induction sealing machine to seal the moisture-resisting film 11 onto the can mouth of the containing can 10. The moisture-resisting film 11 prevents the penetration of moisture and enhances the shelf life of the feed 2 for at least three times before unpack or use. In this way, by embedding the snap switch 13 into the assembly opening 1210, and connecting the screw thread 100 and the screw thread 1202, it realizes the fully automatic production line and achieves the high efficiency fully automatic production process that can fill and produce more than 60 cans per minute. Since it is convenient for the users to purchase the refill packs for the use of the highly productive environmentally friendly quantitative feed feeder 1 continuously, the present disclosure complies with the concept of producing eco-friendly products and conserving earth's resources.

What is claimed is:

1. A highly productive eco-friendly quantitative feeding device, for quantitatively accessing a feed, comprising:

a containing can, for containing the feed;

a feeder, assembled at a can mouth of the containing can, comprising a can cover and an assembly frame part, the assembly frame part being coupled and mounted onto the can cover and having an area of an upper surface smaller than an area of an upper surface of the can cover, the can cover having a feed inlet, a side of the assembly frame part being provided with an assembly opening and an upper surface of the assembly frame part being provided with a feed outlet, and a displacement existing between a center point of the feed inlet and a center point of the feed outlet; and a snap switch, comprising a switch frame, a pressing part, a measuring hopper, a sealing boss, and an elastic fastening structure, the switch frame having a side coupled to the pressing part and an opposite side coupled to the measuring hopper, the sealing boss, and the elastic fastening structure, and the displacement existing between a center point of the measuring hopper and a center point of the sealing boss, wherein when the snap switch is embedded into the assembly opening and movably assembled into the feeder, a hopper mouth of the measuring hopper is coupled to the feed inlet to receive and accommodate a fixed amount of the feed, and the sealing boss is coupled and sealed with the feed outlet, when a pressing force is exerted on the pressing part along a direction, the elastic fastening structure is compressed towards an opposite direction, such that the snap switch is moved along the direction for the displacement, and the sealing boss moves out of a way of the feed outlet, while the measuring hopper is moved to the feed outlet to unload and discharge the fixed amount of the feed, and when the pressing force is released, the snap switch restores the pressing part, the measuring hopper, and the sealing boss to move towards the opposite direction for the displacement by resilience of the elastic fastening structure, wherein the sealing boss comprises a tilting table top, the sealing boss has a bump edge length at least greater than an opening side length of the feed outlet by 1 mm, the sealing boss is made of a highly elastic plastic and provided for elastically abutting against the feed outlet, in order to avoid leakage and achieve an effect of slowing down fermentation and deterioration of the feed.

2. The highly productive eco-friendly quantitative feeding device according to claim 1, wherein the elastic fastening structure comprises an elastic fastener and a rebound part, the elastic fastener is a substantially curved rib, the rebound part is also a substantially curved rib, and the elastic fastener and the rebound part are disposed opposite to each other, such that a front end of the elastic fastener and a front end of the rebound part are opposite to each other, and when the pressing force is exerted on the pressing part, the elastic fastener and the rebound part are contracted in a direction towards a center of the snap switch.

3. The highly productive eco-friendly quantitative feeding device according to claim 2, wherein the front end of the elastic fastener is provided with a snap bead, an inner surface of another side of the assembly frame part is provided with a plurality of acoustic positioning ribs, the plurality of acoustic positioning ribs is arranged with a gap from one another, when the snap switch is assembled to the feeder, the snap bead is adjacent to one of the plurality of acoustic positioning ribs, and when the pressing force is exerted on the pressing part to compress the elastic fastener, the snap bead successively slides through each of the plurality of acoustic positioning ribs and makes a sound to indicate a pushing progress, and while the snap bead successively snaps on a side of each of the plurality of acoustic positioning ribs to achieve an anti-slip effect, so as to reduce a requirement of continuously outputting the pressing force and facilitating ease of use.

4. The highly productive eco-friendly quantitative feeding device according to claim 1, wherein an inner side of the upper surface of the can cover is formed with a plurality of tilted covers, each extending outward from the center of the feed inlet, the plurality of tilted covers is provided for enhancing an effect concentrating and sliding the feed towards the feed inlet by a tilt angle of the plurality of tilted covers, and a surface periphery of the upper surface of the assembly frame part is formed with a protruding fence for surrounding the feed outlet to prevent the feed from overflowing and wasting.

5. The highly productive eco-friendly quantitative feeding device according to claim 4, wherein at least one of the plurality of tilted covers is configured with a different exposed area and a different tilt angle.

6. The highly productive eco-friendly quantitative feeding device according to claim 1, further comprising a moisture-resisting film covered onto the can mouth of the containing can for preventing moisture from penetrating, so as to extend an expiration date of the feed before it is unopened for use.

7. The highly productive eco-friendly quantitative feeding device according to claim 1, wherein the containing can is configured to be a substantially round can having an outer thread formed on an outer side of the can mouth, an inner thread formed on an inner side of an opening of the can cover and the can cover is configured to be corresponsive to the containing can, and the feeder is coupled to the containing can through the outer thread and the inner thread, and the assembly frame part is configured to be corresponsive to the can cover and is a substantially semicircular frame with the area of the upper surface smaller than the area of the upper surface of the can cover, and the pressing part is substantially fan-shaped, such that when the snap switch is installed into the assembly frame part, the pressing part is partially or wholly exposed from the area of the upper surface of the assembly frame part, and the area of the upper surface of the assembly frame part coupled to an exposed area of the pressing part is smaller than or equal to an exposed area of the can mouth of the containing can.

8. The highly productive eco-friendly quantitative feeding device according to claim 1, wherein the containing can is a substantially rectangular can with a hook structure disposed on an outer side of the can mouth, the can cover is a substantially rectangular cover with a hook slot structure disposed on an inner side of an opening of the can cover and configured to be corresponsive to the hook structure, and the feeder is coupled to the containing can through the hook slot structure and the hook structure, and the assembly frame part is a rectangular frame configured to be corresponsive to the can cover and having an area smaller than the can cover, the pressing part is substantially rectangular, and when the assembly frame part is assembled to the snap switch, the pressing part is partially or wholly exposed from the area of the upper surface of the assembly frame part, and the area of the upper surface of the assembly frame part coupled to an exposed area of the pressing part is smaller than or equal to an exposed area of the can mouth of the containing can.

* * * * *